(12) United States Patent
Doll et al.

(10) Patent No.: US 9,300,195 B2
(45) Date of Patent: Mar. 29, 2016

(54) LINEAR MOTOR FOR A SMALL ELECTRIC HANDHELD DEVICE

(75) Inventors: Alexander Franz Doll, Kronberg (DE); Uwe Schober, Schlossborn (DE); Frank Peter Kressmann, Eschborn (DE); Frank Ziegler, Karben (DE)

(73) Assignee: The Gillette Company, Boston, MA (US)

( * ) Notice: Subject to any disclaimer, the term of this patent is extended or adjusted under 35 U.S.C. 154(b) by 464 days.

(21) Appl. No.: 13/477,243

(22) Filed: May 22, 2012

(65) Prior Publication Data

US 2013/0002055 A1    Jan. 3, 2013

Related U.S. Application Data

(60) Provisional application No. 61/502,942, filed on Jun. 30, 2011.

(51) Int. Cl.
| | |
|---|---|
| *H02K 33/00* | (2006.01) |
| *H02K 33/16* | (2006.01) |
| *H02K 1/12* | (2006.01) |
| *H02K 1/02* | (2006.01) |

(Continued)

(52) U.S. Cl.
CPC ............. *H02K 33/16* (2013.01); *B26B 21/38* (2013.01); *H02K 1/02* (2013.01); *H02K 1/12* (2013.01); *H02K 5/02* (2013.01); *H02K 33/00* (2013.01)

(58) Field of Classification Search
CPC ......... H02K 33/00; H02K 33/16; H02K 1/02; H02K 1/12; H02K 5/02; B26B 21/38

USPC ............... 310/23, 25, 50, 15, 30, 34; 30/43.1, 30/43.2, 43.7, 43.8, 43.91, 43.92
IPC ....................................................... H02K 33/00
See application file for complete search history.

(56) References Cited

U.S. PATENT DOCUMENTS

| | | | | |
|---|---|---|---|---|
| 1,812,668 | A * | 6/1931 | Stewart | F23N 3/08 200/1 A |
| 1,903,231 | A * | 3/1933 | Colman | H02K 7/065 200/1 A |
| 2,222,308 | A | 11/1940 | Bott | |

(Continued)

FOREIGN PATENT DOCUMENTS

| | | |
|---|---|---|
| DE | 102 42 094 A1 | 1/2004 |
| JP | 2005234244 | 2/2005 |

OTHER PUBLICATIONS

PCT International Search Report with Written Opinion in corresponding Int'l appln. PCT/US2012/039483 dated Aug. 19, 2013.

*Primary Examiner* — John K Kim
(74) *Attorney, Agent, or Firm* — Kevin C. Johnson; Steven W. Miller (57) ABSTRACT

A handle for a small electric handheld appliance in which the handle comprises a motor assembly disposed in the handle. The motor assembly comprises a generally L-shaped magnetic yoke formed from two substantially perpendicular surfaces, such that the two substantially perpendicular surfaces define a concave receiving portion. The motor assembly also comprises an iron core and a coil winding disposed substantially in the concave receiving portion, such that the iron core and the coil winding are free from contact with one of the two substantially perpendicular surfaces when the motor is at rest.

11 Claims, 9 Drawing Sheets

(51) Int. Cl.
*B26B 21/38* (2006.01)
*H02K 5/02* (2006.01)

(56) References Cited

U.S. PATENT DOCUMENTS

| | | | | |
|---|---|---|---|---|
| 2,278,365 | A * | 3/1942 | Daniels | A61C 17/3427 |
| | | | | 132/73.6 |
| 2,940,027 | A * | 6/1960 | Waugh, Jr. | G05B 11/017 |
| | | | | 310/25 |
| 3,041,118 | A * | 6/1962 | Campbell | 310/244 |
| 3,098,987 | A * | 7/1963 | Holden | H03H 9/48 |
| | | | | 178/47 |
| 3,223,861 | A * | 12/1965 | Steiner | G10K 9/18 |
| | | | | 310/21 |
| 3,312,841 | A * | 4/1967 | Makino | 310/15 |
| 4,346,318 | A * | 8/1982 | Shtrikman | H02K 33/06 |
| | | | | 310/12.24 |
| 4,744,144 | A | 5/1988 | Lowery, Sr. et al. | |
| 6,098,288 | A | 8/2000 | Miyagawa et al. | |
| 7,681,320 | B2 | 3/2010 | Szczepanowski et al. | |
| 2002/0108251 | A1 | 8/2002 | Brum et al. | |
| 2007/0101574 | A1 | 5/2007 | Royle et al. | |
| 2008/0155831 | A1 | 7/2008 | Royle | |
| 2009/0056142 | A1 | 3/2009 | Royle et al. | |
| 2013/0002055 | A1 * | 1/2013 | Doll et al. | 310/25 |

* cited by examiner

LINEAR MOTOR FOR A SMALL ELECTRIC HANDHELD DEVICE

CROSS REFERENCE TO RELATED APPLICATIONS

This application claims the benefit of U.S. Provisional Application No. 61/502,942, filed on Jun. 30, 2011.

FIELD OF THE INVENTION

The invention generally relates to motors for small, electric handheld devices.

BACKGROUND OF THE INVENTION

Small, electric handheld devices, such as a powered razor or a powered toothbrush, typically include a motor to drive another component, such as an eccentric weight. For example, a direct current (DC) electric motor is used to drive an eccentrically mounted component. Various design considerations, however, impact the performance of the motor and the construction of the electric handheld device. Current approaches to utilizing a motor in a small, electric handheld device may include DC motors and/or E-shaped magnetic yokes to be fit within a constrained space. For example, the handle of a powered wet shaving razor is commonly bulkier and/or larger than the corresponding manual wet shaving razor in order to accommodate the electronics, such as the motor. A bulkier and/or larger handle may result in a less than desirable ergonomic form. In one example, the smallest diameter of the handle of the Fusion®ProGlide™ Power wet shaving razor (available from The Gillette Company, Boston, Mass.) is about 11-12 mm. In this constrained space, a motor must be accommodated with sufficient output to drive the handheld device. Moreover, performance of the DC motors depends on vibration frequency which depends on the operating voltage. Although the vibration frequency of a DC motor can be changed, amplitude of the vibrations cannot be changed. Furthermore, vibrations of a DC motor are affected by attenuation (e.g., touching of the handheld device by a user), temperature, and/or aging. Generally, however, if a smaller space is desirable then a smaller motor is used, but performance of the motor and the driven component may be compromised or undesirable. Examples of a small, electric handheld device incorporating certain motors include U.S. Patent Application Publication Nos. 2010/0175207, 2008/0204177, 2007/0137043, and 2005/0046281 and U.S. Pat. Nos. 7,554,225, 7,015,602, and 6,933,630.

What is needed, then, is a linear motor to be accommodated within a handle of a small, electric handheld device in which the motor is smaller in width, has fewer parts, and is more durable compared to current approaches. The motor of the small, electric handheld device, though smaller in width, preferably performs (e.g., efficiency) about the same, if not better, than current handheld devices. Even more preferably, a frequency, such as a resonance frequency, of the motor assembly can be controlled more easily.

SUMMARY OF THE INVENTION

In one aspect, the invention relates to a handle for a small electric hand-held appliance. The handle comprises a motor assembly disposed in the handle. The motor assembly comprises a generally L-shaped magnetic yoke formed from two substantially perpendicular surfaces, such that the two substantially perpendicular surfaces define a concave receiving portion. The motor assembly also comprises an iron core and a coil winding disposed substantially in the concave receiving portion, such that the iron core and the coil winding are free from contact with one of the two substantially perpendicular surfaces when the motor assembly is at rest.

The foregoing aspect can include any one or more of the following embodiments. The motor assembly can further comprise at least one magnet disposed substantially in the concave receiving portion. The at least one magnet can be two magnets disposed substantially in the concave receiving portion. The at least one magnet and the iron core can be free from contact such that a first gap is formed, the at least one magnet and the generally L-shaped magnetic yoke can be free from contact such that a second gap is formed. The first gap and the second gap can be substantially perpendicular to each other. The first gap and the second gap can form an angle therebetween of about 60 degrees to about 120 degrees. The motor assembly can further comprise a back iron disposed substantially in the concave receiving portion. The back iron can be free from contact with the iron core. The back iron can be coupled to and disposed above the at least one magnet. The back iron can be free from contact with the generally L-shaped magnetic yoke. The motor assembly can further comprise a leaf spring coupled to the generally L-shaped magnetic yoke. The leaf spring can be configured to define a resonant frequency of the motor assembly. The leaf spring can be generally U-shaped. The leaf spring can only contact a portion of the generally L-shaped magnetic yoke such that the leaf spring can be free of contact from and/or does not have any surface that overlaps one of the two substantially perpendicular surfaces of the generally L-shaped magnetic yoke. The parallel surfaces of the generally U-shaped leaf spring do not overlap at least one of the two substantially perpendicular surfaces of the magnetic yoke. The motor assembly can be resonant. The motor assembly can further comprise a mass coupled to the back iron. The mass and/or the back iron can be magnetic, e.g., the mass and/or the back iron can be a soft magnetic material. The mass can be a non-magnetic material. The mass can be at least one of the back iron or the at least one magnet. The mass can be configured to define a resonant frequency of the motor assembly. A resulting force of the motor assembly can be substantially linear with a deflection of the mass. The motor assembly can further comprise a mount coupled to an exterior of one of the two substantially perpendicular surfaces of the generally L-shaped magnetic yoke and to the iron core such that the mount is not disposed within the concave receiving portion. The motor assembly can be configured to apply a linear vibration along a longitudinal axis of the handle. The motor assembly can be accommodated in a portion of the handle having a diameter less than about 7 mm. A frequency of the motor assembly can be about 50 Hz to about 500 Hz.

In another aspect, the invention relates to a handle for a small electric handheld appliance. The handle comprises a motor assembly disposed in the handle. The motor assembly comprises a generally L-shaped magnetic yoke formed from two substantially perpendicular surfaces, such that the two substantially perpendicular surfaces define a concave receiving portion. The motor assembly also comprises an iron core, a coil winding, and at least one magnet disposed substantially in the concave receiving portion, such that the at least one magnet and the iron core are free from contact such that a first gap is formed, the at least one magnet and the generally L-shaped magnetic yoke are free from contact such that a second gap is formed, and the first gap and the second gap are substantially perpendicular to each other.

This aspect can include any one or more of the following embodiments. The first gap and the second gap can form an angle therebetween of about 60 degrees to about 120 degrees. The at least one magnet can be two magnets disposed substantially in the concave receiving portion. The motor assembly can further comprise a back iron disposed substantially in the concave receiving portion. The back iron can be free from contact with the iron core. The back iron can be coupled to and disposed above the at least one magnet. The back iron can be free from contact with the generally L-shaped magnetic yoke. The motor assembly can further comprise a leaf spring coupled to the generally L-shaped magnetic yoke. The leaf spring can be configured to define a resonant frequency of the motor assembly. The leaf spring can be generally U-shaped. The leaf spring can only contact a portion of the generally L-shaped magnetic yoke such that the leaf spring can be free of contact from and/or does not have any surface that overlaps one of the two substantially perpendicular surfaces of the generally L-shaped magnetic yoke. The parallel surfaces of the generally U-shaped leaf spring do not overlap at least one of the two substantially perpendicular surfaces of the magnetic yoke. The motor assembly can be resonant. The motor assembly can further comprise a mass coupled to the back iron. The mass and/or the back iron can be magnetic, e.g., the mass and/or the back iron can be a soft magnetic material. The mass can be a non-magnetic material. The mass can be at least one of the back iron or the at least one magnet. The mass can be configured to define a resonant frequency of the motor assembly. A resulting force of the motor assembly can be substantially linear with a deflection of the mass. The motor assembly can further comprise a mount coupled to an exterior of one of the two substantially perpendicular surfaces of the generally L-shaped magnetic yoke and to the iron core such that the mount is not disposed within the concave receiving portion. The motor assembly can be configured to apply a linear vibration along a longitudinal axis of the handle. The motor assembly can be accommodated in a portion of the handle having a diameter less than about 7 mm. A frequency of the motor assembly can be about 50 Hz to about 500 Hz.

BRIEF DESCRIPTION OF THE DRAWINGS

Other features and advantages of the present invention, as well as the invention itself, can be more fully understood from the following description of the various embodiments, when read together with the accompanying drawings, in which.

DETAILED DESCRIPTION OF THE INVENTION

Except as otherwise noted, the articles "a," "an," and "the" mean "one or more."

Figure 1:
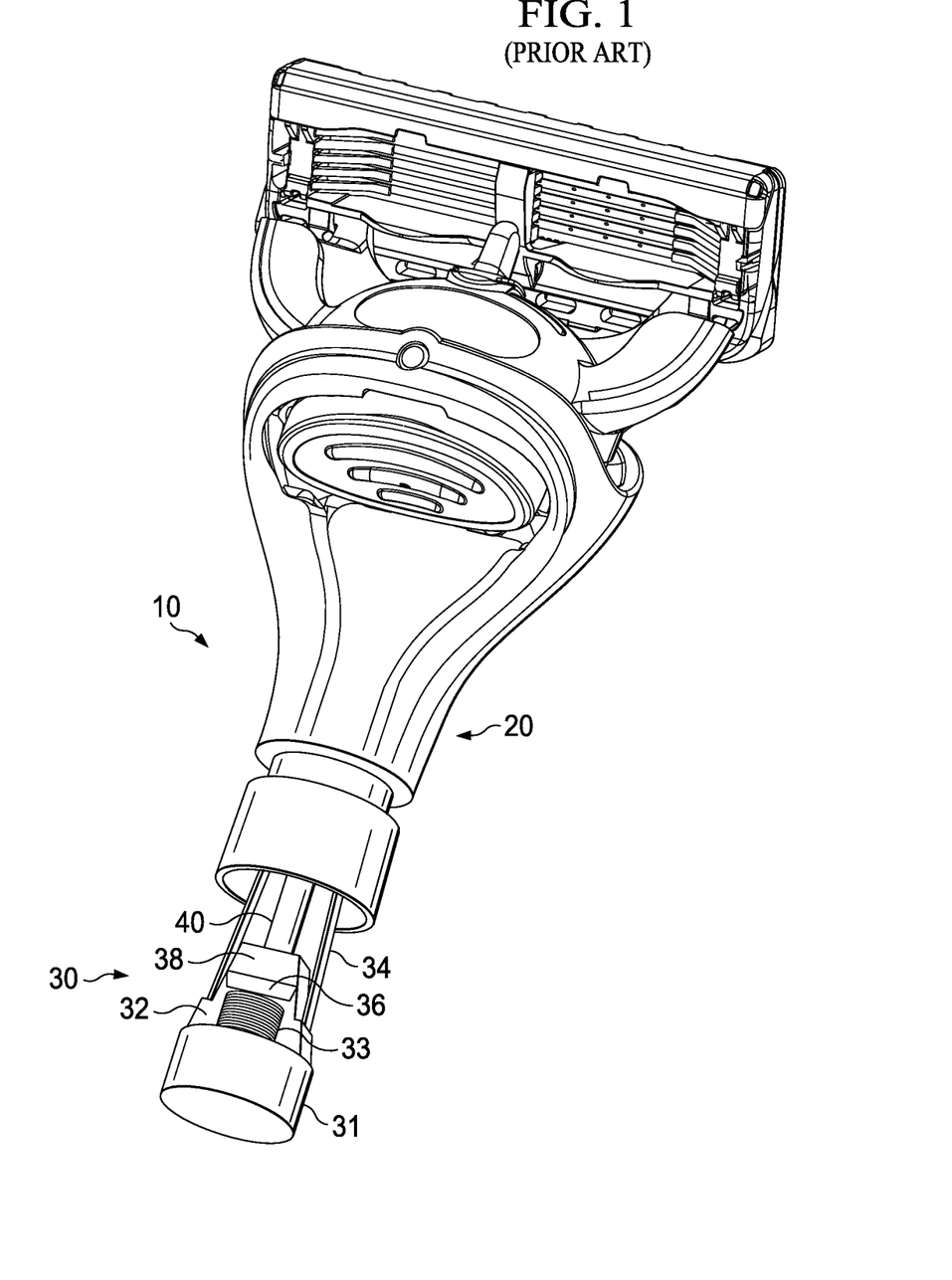
FIG. 1 is a schematic perspective view of a known motor assembly disposed in a handle of a small, electric handheld appliance.

Referring to FIG. 1, a known small, electric handheld device 10 comprises a handle 20 and a motor assembly 30 disposed within the handle. The motor assembly 30 includes a motor mounting 31 coupled to a U- or C-shaped magnetic yoke 32. Nonlimiting examples of motor assemblies with magnetic yokes are described in U.S. Patent Application Publication Nos. 2010/0175207, 2008/0204177, 2007/0137043, and 2005/0046281 and U.S. Pat. Nos. 7,554,225, 7,015,602, 6,933,630, and 6,051,902. A coil 33 is disposed within the U- or C-shaped magnetic yoke 32. A pair of leaf springs 34 is coupled to an exterior of the magnetic yoke 32 in which the pair of leaf springs 34 converges generally above the magnetic yoke 32. Also disposed above the magnetic yoke 32 is a pair of magnets 36 coupled to a back iron 38, also above the magnetic yoke 32. A lever 40, disposed above the back iron 38, is coupled to the leaf springs 34 at a portion defining the output of the motor assembly 30. When the motor assembly 30 is in operation, the leaf springs 34 define the resonance frequency and the virtual pivoting axis of the output in which the magnets 36 and the back iron 38 can oscillate from side-to-side.

In known small, electric handheld devices, the motor assembly is a DC motor assembly. DC motor assemblies typically perform at about 3,000 to about 30,000 RPM with the frequency of up to about 50 to about 500 Hz. DC motor assemblies in powered wet shaving razors often fit within a diameter of a handle of about 10 to about 11 mm.

Figure 2:
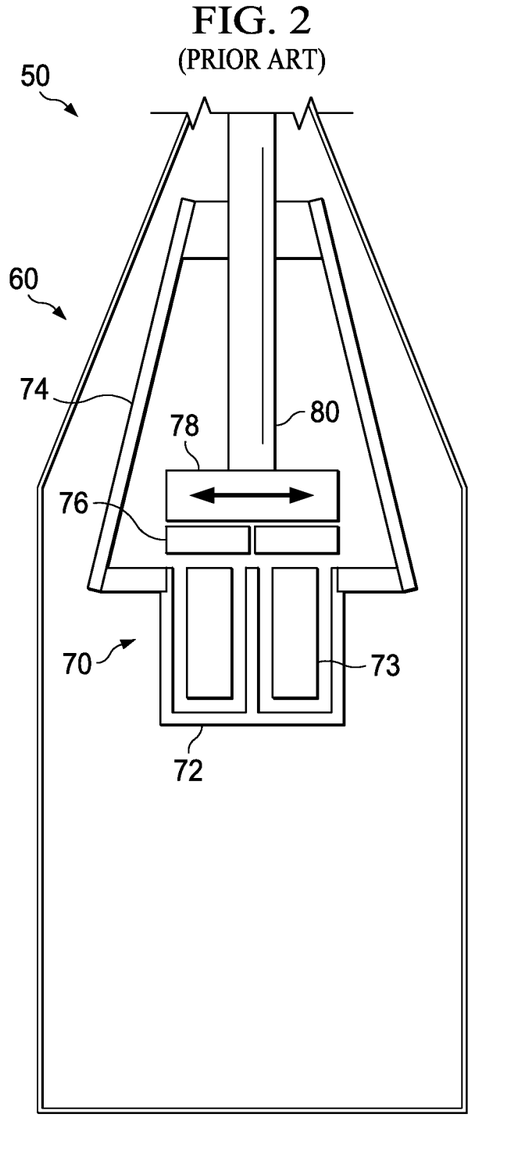
FIG. 2 is a schematic side view of a known motor assembly.

In FIG. 2, a portion of another known small, electric handheld device 50 comprises a portion of a handle 60 and a motor assembly 70 disposed within the handle. The motor assembly 70 includes an E-shaped magnetic yoke 72. Coils 73 are disposed within the E-shaped magnetic yoke 72. A pair of leaf springs 74 is coupled to an exterior of the magnetic yoke 72 in which the pair of leaf springs 74 converges generally above the magnetic yoke 72. Also disposed above the magnetic yoke 72 is a pair of magnets 76 coupled to a back iron 78, also above the magnetic yoke 72. A lever 80, disposed above the back iron 78, is coupled to the leaf springs 74 at a portion defining the output of the motor assembly 70. When the motor assembly 70 is in operation, the leaf springs 74 define the resonance frequency and the virtual pivoting axis of the output in which the magnets 76 and the back iron 78 can oscillate from side-to-side.

Figure 3:
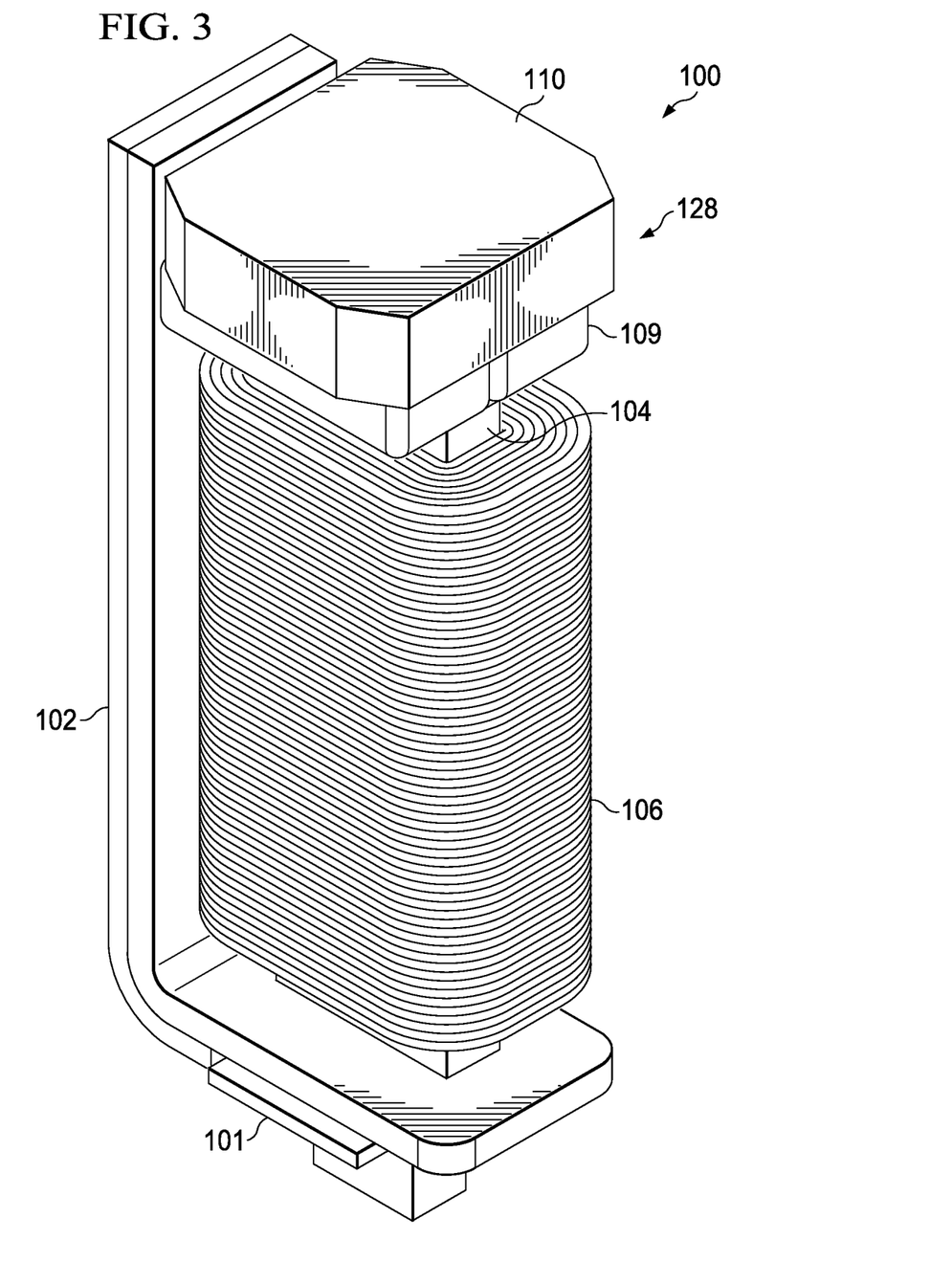
FIG. 3 is a schematic perspective view of motor assembly according to an embodiment of the invention.
Figure 4:
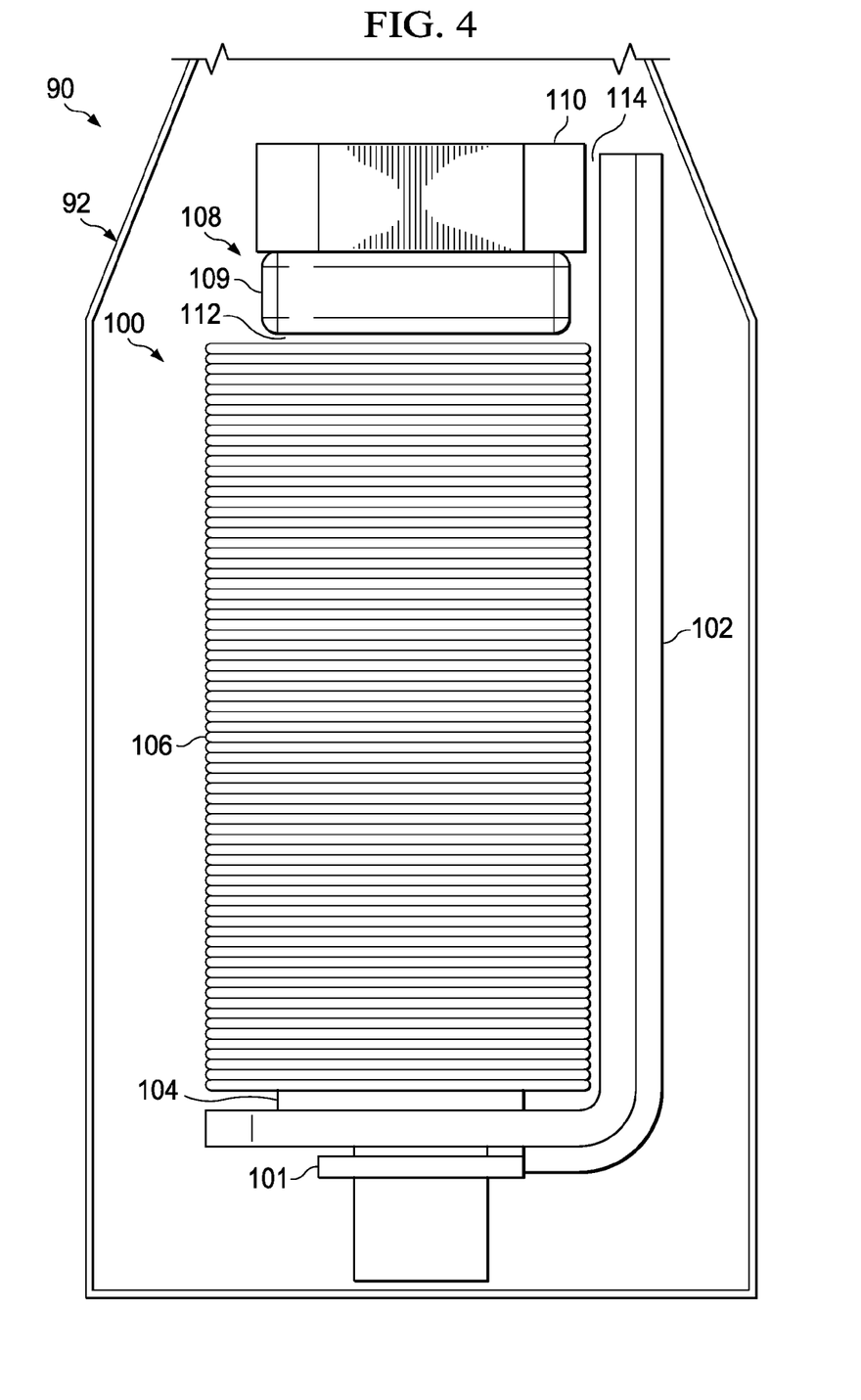
FIG. 4 is a schematic side view of the motor assembly of FIG. 3 disposed in a handle of a small, electric handheld appliance.

FIGS. 3 and 4 depict an embodiment of the present invention. A motor assembly 100 is disposed within a handle 92 of a small electric handheld appliance 90. Motor assembly 100 for a linear motor includes a motor mounting 101 coupled to a generally L-shaped magnetic yoke 102 in which the yoke 102 has two substantially perpendicular surfaces (e.g., two generally linear surfaces that are substantially perpendicular) defining a concave receiving portion. By "generally linear" the surfaces of the yoke 102 may include non-linear elements, e.g., ridges, protrusions, or recesses, and/or may include regions along its length that are not linear, such as tapered and/or flared ends due to manufacturing and design considerations. Additionally or alternatively, the generally L-shaped magnetic yoke 102 comprises two generally L-shaped components, though each component need not be identical. For example, the two components can contact one another and at least partially overlap. In an embodiment, the motor mounting 101 is disposed below the generally L-shaped magnetic yoke 102. An iron core 104 is coupled to the generally L-shaped magnetic yoke 102 with a coil winding 106 wound around the iron core 104. Disposed above the iron core 104 and the coil winding 106 is a mass 108. The mass can be selected from the group consisting of at least one magnet 109, such as a pair of magnets, a back iron 110, and combinations thereof. In an embodiment, the mass can be magnetic. The mass makes up the moving part of the motor assembly 100. The at least one magnet 109 is disposed within the concave receiving portion of the generally L-shaped magnetic yoke 102. Additionally or alternatively, the back iron 110 is also disposed at least substantially within the concave receiving portion of the generally L-shaped magnetic yoke 102. In an embodiment, a portion of the back iron 110 is disposed outside of the concave receiving portion. The magnet 109 and the back iron 110 are free from contact with the iron core. The iron core and the coil winding are free from contact with one of the two substantially perpendicular surfaces. The magnet 109 is free from contact with the iron core 110 such that a first gap 112 is formed. The magnet 109 is free from contact with the generally L-shaped magnetic yoke 102 such that a second gap is formed 114. The first gap 112 and the second gap 114 are substantially perpendicular to one another. Forming these air gaps 112, 114 in a perpendicular orientation, as opposed to a planar orientation, facilitates smaller dimensioning of the motor assembly 100 (e.g., a smaller footprint to be accommodated in the handheld device), for example, such that the motor assembly 100 can fit into a dimension having a smaller diameter or width.

In an embodiment of the present invention, the motor assembly relates to a linear vibration motor, e.g., such that the motor assembly applies a linear vibration along a longitudinal axis of the handle. Without intending to be bound by any theory, it is believed that linear vibrations are advantageous for certain applications of small, electric handheld devices, such as for wet shaving and for teeth brushing. In the wet shaving and teeth brushing applications, it is believed that a rotating vibrating motor produces unpleasant vibrations to the human body (e.g., skin, hand, etc.). Moreover, with a linear motor, amplitude of the vibrations can be more easily changed. Frequency of the vibrations can be easily changed, too, for linear motors and frequency can be controlled without being affected by the operating voltage, load (e.g., damping), aging, temperature, or other factors. For the linear motor assembly of the present invention, amplitude and frequency can be adjusted independent of one another.

In an embodiment, the entire motor assembly 100 can be resonant. The mass can define the resonant frequency. The back iron and/or armature can be electrically magnetic, e.g., made from tungsten, preferably high density tungsten.

FIGS. 5, 6A, 6B, and 7 depict another embodiment of the present invention in which a motor assembly 200, with a generally L-shaped magnetic yoke 202 having two substantially perpendicular surfaces (e.g., two generally linear surfaces that are substantially perpendicular) defining a concave receiving portion, also includes an armature 204. Motor assembly 200 is to be disposed in a handle of a small electric handheld appliance such as previously shown in FIG. 4. The armature 204 can be disposed on top of a back iron 206 which is in turn disposed on top of at least one magnet 208, such as two magnets. Additionally or alternatively, a leaf spring 210, or a pair of leaf springs, is coupled to the generally L-shaped magnetic yoke 202, e.g., to an exterior of the magnetic yoke 202. In an embodiment, the leaf spring 210, or the pair of leaf springs, only contacts a portion of the magnetic yoke 202 such that the leaf spring 210, or the pair of leaf springs, does not contact one of the two substantially perpendicular surfaces of the magnetic yoke 202. The leaf spring 210 can be a single, unitary generally U-shaped structure or the leaf spring 210 can be a pair of unitary generally L-shaped structures. The leaf spring 210 may be generally U-shaped or generally L-shaped even if the leaf spring 210 includes ridges, protrusions, apertures, recesses, or tapered and/or flared ends due to manufacturing and design considerations. In an embodiment, the leaf spring 210 contacts or is coupled to the back iron 206 and/or the armature 204, such that the leaf spring 210 does not contact the magnet 208. Additionally or alternatively, the surfaces of the leaf spring 210, or surfaces of the pair of leaf springs, that contacts or is coupled to the back iron 206 and/or the armature 204 can be generally parallel. The generally parallel surfaces allows for a generally constant distance of the air gap between the magnet 208 and iron core 212 (shown in FIGS. 6A and 6B by showing only partially coil winding 214). In an embodiment, a mass can be selected from the group consisting of at least one magnet 208, such as a pair of magnets, a back iron 206, the armature 204, the leaf spring 210, such as a pair of leaf springs, and combinations thereof. The mass makes up the moving part of the motor assembly. In an embodiment, the armature 204 is disposed outside of the concave receiving portion of the generally L-shaped magnetic yoke 202.

Examples of suitable materials for the back iron 206, the magnetic yoke 202, and the iron core 212 include, but are not limited to, a soft magnetic material, such as an electrical sheet (laminated), magnetic steel, or a soft magnetic plastic material. In an embodiment, magnet 208 is preferably a rare earth magnet (e.g., NdFeB and SmCo) or a hard magnetic material (e.g., AlNiCo). In an embodiment, the coil winding 214 is preferably a wire made of copper, aluminum or silver. The coil winding 214 could alternatively be made of sheets, such as those suitable for the back iron 206, the magnetic yoke 202, and/or the iron core 212. In an embodiment, the leaf spring 210 is preferably a non-magnetic steel material, such as stainless steel. In an embodiment, the armature 204 is preferably a high density material, e.g., tungsten. The armature 204 can also be the same material as the back iron 206.

The motor mounting can be disposed on the bottom of the iron core. In such an embodiment, magnet, back iron, armature 204 (e.g., the mass), or combinations thereof move when the motor assembly is in operation. In an alternative arrangement, the magnet, back iron, armature (e.g., the mass), or combinations thereof can be mounted on a housing. In such an arrangement, the rest of the motor assembly moves when the motor assembly is in operation such that the additional moving parts act as an additional oscillating mass.

Figure 5:
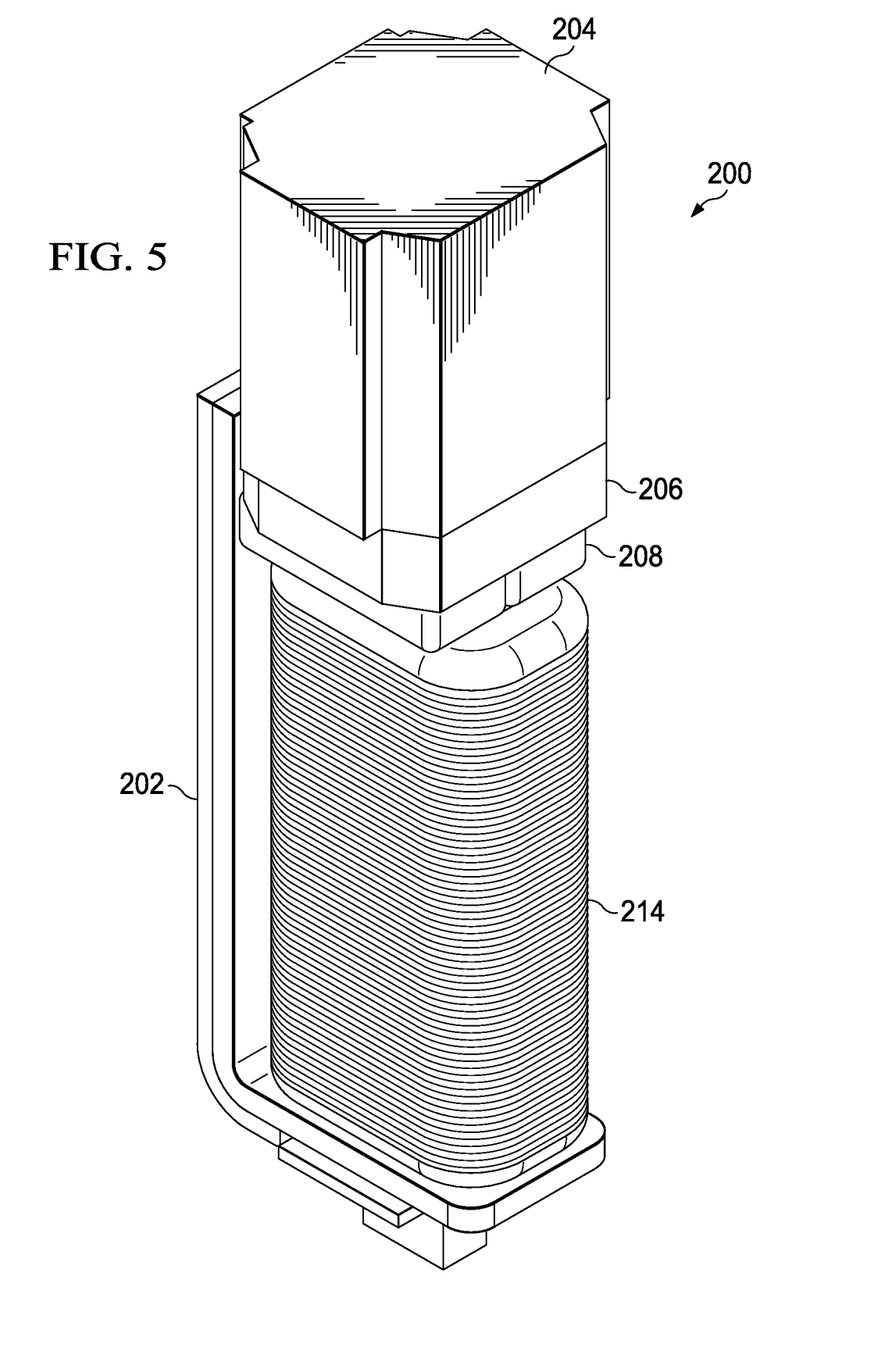
FIG. 5 is a schematic perspective view of a motor assembly in accordance with an embodiment of the invention.
Figure 6A:
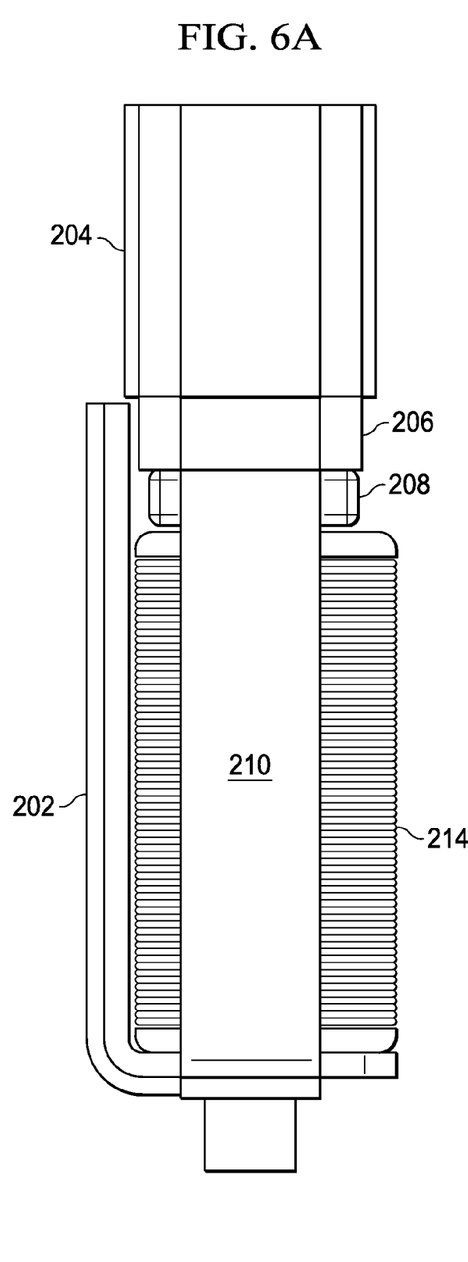
FIGS. 6A and 6B depict schematic perspective and front views, respectively, according to an embodiment of the invention.
Figure 6B:
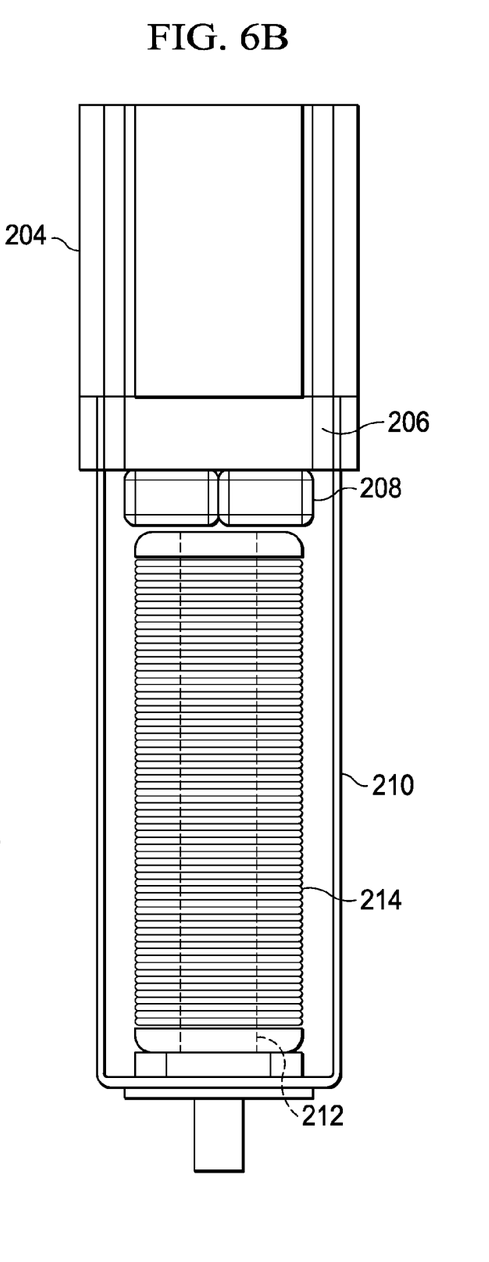
Figure 7:
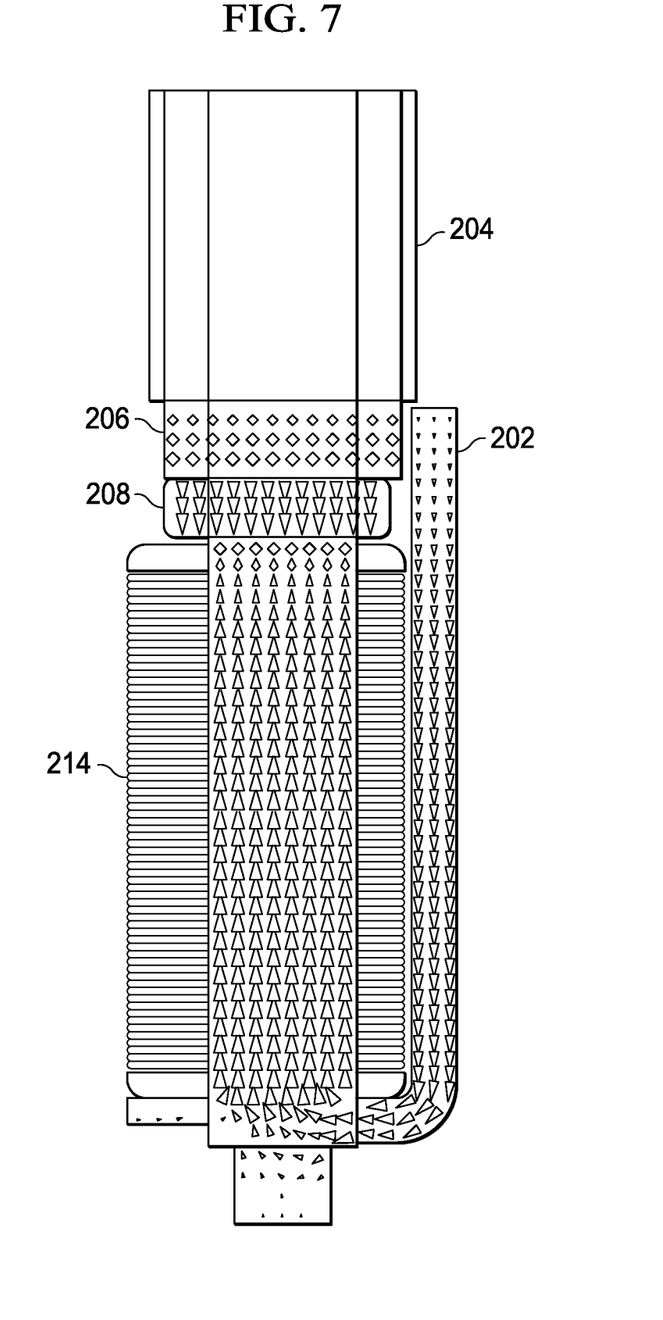
FIG. 7 is a schematic side view of the motor assembly of FIGS. 6A and 6B, showing the vector of magnetic flux density.

Referring now to FIG. 7, vectors of the magnetic flux density are shown of an embodiment of the present invention, e.g., that shown in FIGS. 5, 6A, and 6B. A current through a coil winding 214 inducts a magnetic flux into an iron core 212. The magnet 208, such as a pair of magnets, consequently aligns according to the magnetic flux density. The magnetic circuit makes up a closed loop with the back iron 206, magnet 208, the generally L-shaped magnet yoke 202, and the bottom part of the iron core 212. In such a circuit, there are two air gaps: (1) between the magnet 208 and the iron core 212 and (2) between the back iron 206 and the generally L-shaped magnetic yoke 202. The air gaps are not oriented in the sample plane, but are oriented perpendicular to each other. Due to the large overlapping faces between the yoke 202 and the back iron 206, the magnetic resistance of the air gap therebetween is low. This facilitates a high magnetic force.

Figure 8:
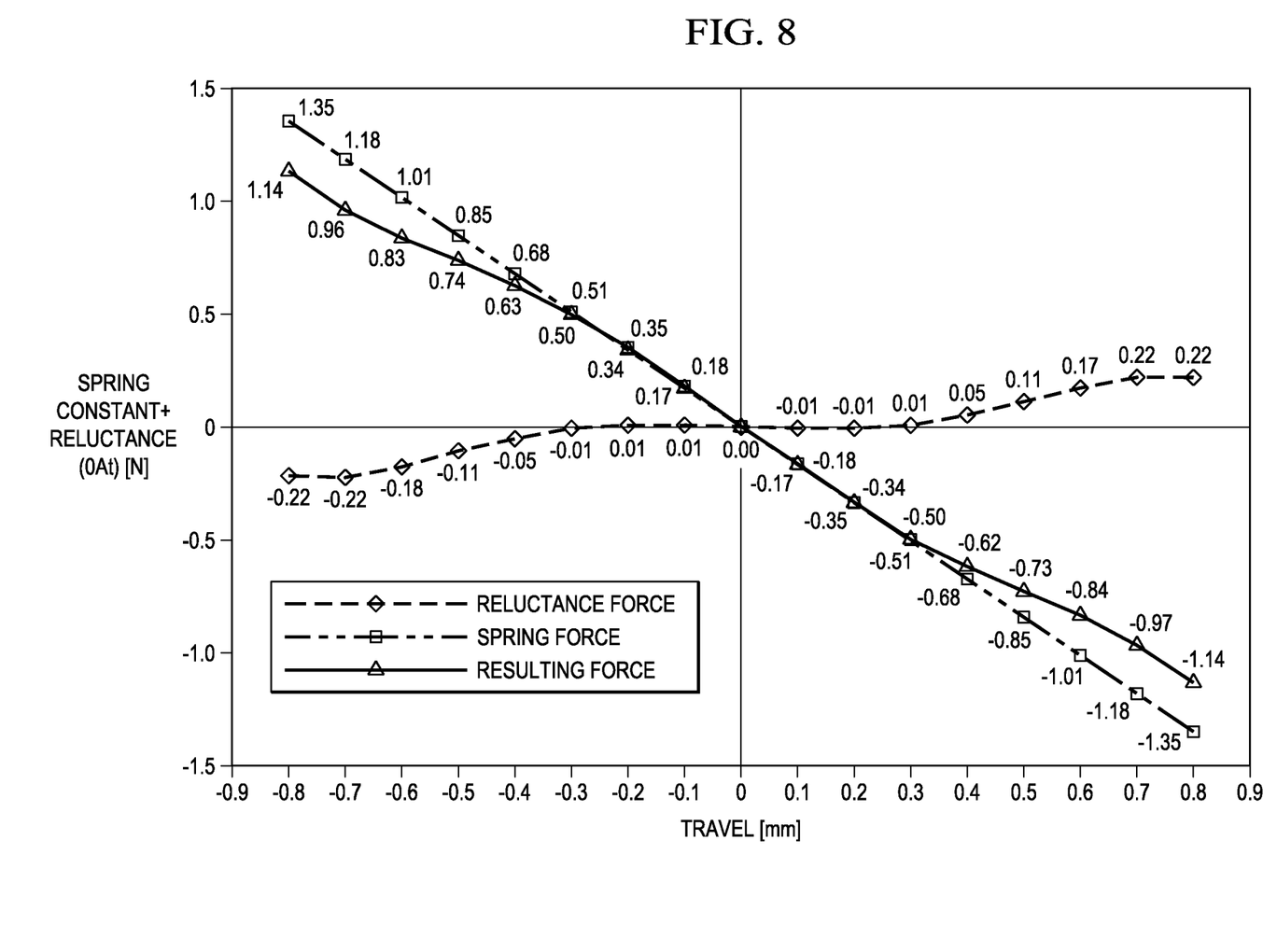
FIG. 8 is a graph of forces versus displacement of a motor assembly according to an embodiment of the invention.

Depicted in FIG. 8 is a graph of the forces of the motor assembly over a travel distance of the mass of the embodiment of the present invention shown, for example, in FIGS. 5, 6A, and 6B. In such an embodiment, an oscillating resonance system can be achieved. The resonance frequency can be calculated as:

$$f = \frac{1}{2\pi}\sqrt{\frac{C}{m}}$$

where f=Resonance Frequency, m=Mass, and C=Total Spring Rate. Total spring rate is the sum of the spring constant and the magnetic reluctance forces. Total spring rate (C) can be derived from a linear regression of the resulting force.

In an embodiment, the resulting force has a substantially linear slope over the travel distance of the mass. In such an embodiment, a defined resonance frequency over a desired travel range can be achieved. A substantially linear resulting force can be achieved in various ways. For example, the magnetic reluctance force can be designed to be very small (e.g., near or almost zero) compared to the spring force such that the sum of the reluctance force and the spring force (i.e., the resulting force) is substantially linear because the spring force is linear or substantially linear. In another example, the magnetic system can be designed with a substantially linear reluctance force over the travel range.

The motor assembly of the present invention can be accommodated in a portion of a small, electric handheld device having a maximum outside diameter of about 8 mm, and preferably of about 7 mm. During operation, the mass exhibits a displacement of about +/−0.7 mm during operation. The resonance frequency of the motor assembly can be about 10 Hz to about 500 Hz, preferably about 10 Hz to about 120 Hz, even more preferably about 95 to about 105 Hz, and still even more preferably about 100 Hz. In comparison to known motor assemblies for small, electric handheld devices, the present invention is of smaller size (e.g., about 30% smaller size with respect to outside diameter), a simple design with fewer parts, and can have more durability due to less parts to wear), all resulting in lower cost.

In an embodiment, the overall length of the motor assembly depends on the size of the mass (i.e., the moving part of the assembly) and the size of the iron coil. These two parameters can be determined by the intended (operation/resonance) frequency. Small intended frequencies result in a longer motor assembly, and higher intended frequencies result in a shorter motor assembly.

Without intending to be bound by any theory, it is believed that a generally L-shaped magnetic yokes performs about the same as, if not better than, known magnetic yokes, such as U-shaped or E-shaped magnetic yokes. By one measure, a generally L-shaped magnetic yoke has relatively low efficiency. Moreover, assembly of a generally L-shaped magnetic yoke with a metal sheet can be difficult. Typically, motors with high efficiency use laminated metal sheets to achieve lower eddy current losses. Because the motor assembly of the present invention is intended for use in small, electric handheld devices, motors in such devices are small and thus efficiency is typically low. The size of the motors also makes it difficult to use metal sheets. Therefore, it is believed that a generally L-shaped magnetic yoke has about the same efficiency, if not improved efficiency, as known U-shaped or E-shaped magnetic yokes in small, electric handheld devices.

Figure 9A:
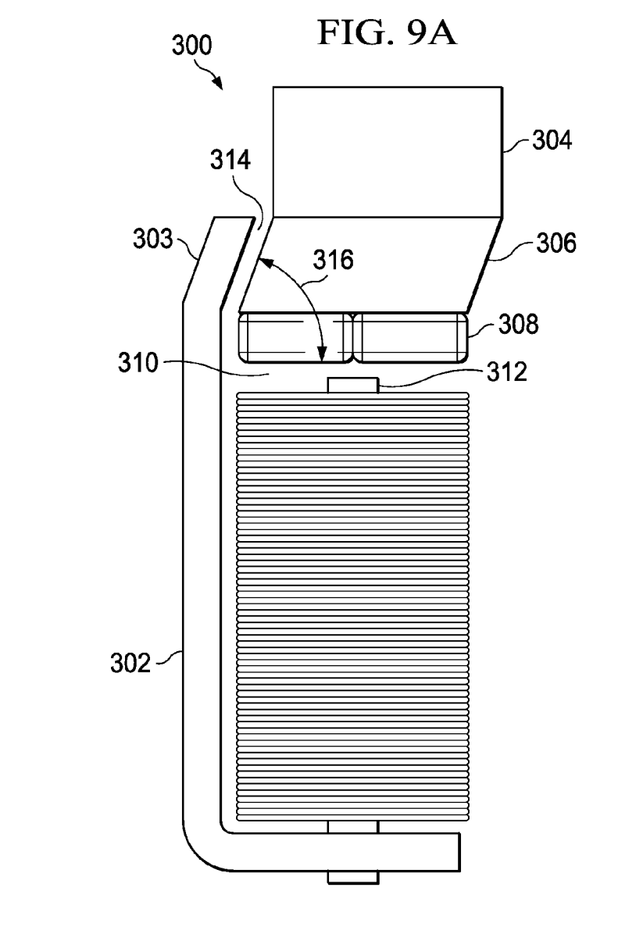
FIGS. 9A and 9B depict schematic side views of various motor assemblies in accordance with embodiments of the invention.
Figure 9B:
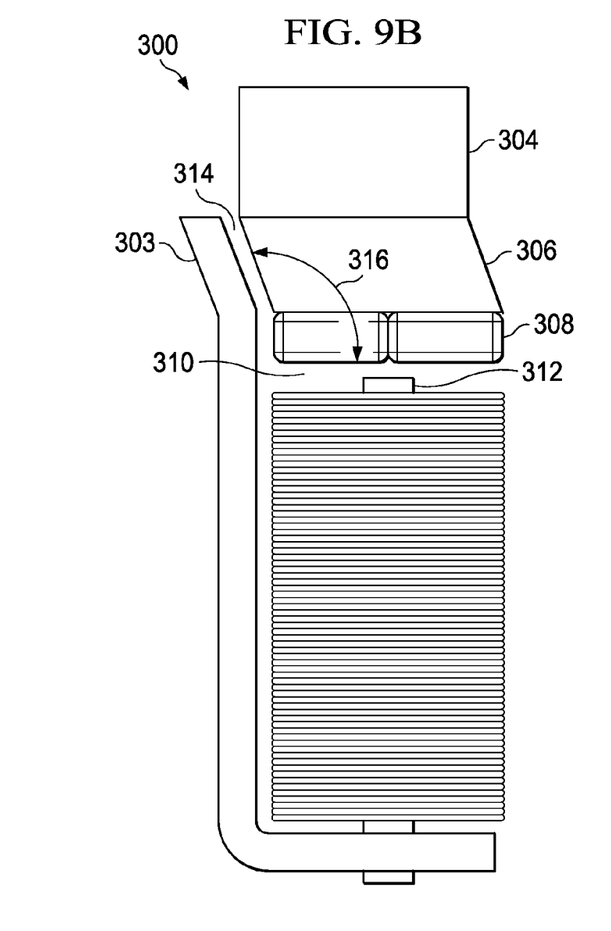

Referring now to FIGS. 9A-B, depicted are various embodiments of the present invention suitable for various mechanical design and space considerations. A motor assembly 300 includes a generally L-shaped magnetic yoke 302 having two substantially perpendicular surfaces (e.g., two generally linear surfaces that are substantially perpendicular) defining a substantially concave receiving portion. Motor assembly 300 is to be disposed in a handle of a small electric handheld appliance such as previously shown in FIG. 4. One of the two generally linear surfaces may have an end portion 303 that is non-coplanar with the remaining portion of the linear surface, though the entire surface is still generally linear. The end portion 303 may form an angle to the remaining portion (from the perspective of the receiving portion) of about 45 degrees to about 135 degrees, preferably about 60 degrees to about 120 degrees. Disposed within the concave receiving portion of the magnetic yoke 302 is an armature 304 disposed on top of a back iron 306 which is in turn disposed on top of at least one magnet 308, such as two magnets. In an embodiment, the armature 304 is disposed outside of the concave receiving portion of the generally L-shaped magnetic yoke 302. Additionally or alternatively, a leaf spring (not shown), or a pair of leaf springs, is coupled to the generally L-shaped magnetic yoke 302, e.g., to an exterior of the magnetic yoke 302. A first air gap 310 is formed between the at least one magnet 308 and an iron core 312, which is coupled to the magnetic yoke 302. A second air gap 314 is formed between the at least one magnet 308 and/or the back iron 306. The angle 316 formed between the first air gap 310 and the second air gap 314 can be about 45 degrees to about 135 degrees, preferably about 60 degrees to about 120 degrees. Such design configurations provides for flexibility of accommodating the motor assembly 300 in various geometries or configurations. The motor assembly 300 may also vary in width and length (e.g., to be longer or shorter or to be wider or smaller in width).

It should be understood that every maximum numerical limitation given throughout this specification includes every lower numerical limitation, as if such lower numerical limitations were expressly written herein. Every minimum numerical limitation given throughout this specification includes every higher numerical limitation, as if such higher numerical limitations were expressly written herein. Every numerical range given throughout this specification includes every narrower numerical range that falls within such broader numerical range, as if such narrower numerical ranges were all expressly written herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An electric appliance, comprising:
    a small electric handheld appliance comprising
        a handle having a longitudinal axis,
        a motor assembly disposed in the handle, the motor assembly comprising:
        a generally L-shaped magnetic yoke formed from two substantially perpendicular surfaces, wherein the two substantially perpendicular surfaces define a concave receiving portion;
        an iron core and a coil winding disposed substantially in the concave receiving portion,
        at least one magnet disposed substantially in the concave receiving portion above the iron core and the coil winding, the at least one magnet being free of contact with the generally L-shaped magnetic yoke;
        a back iron disposed substantially in the concave receiving portion, the back iron is free from contact with the iron core, the back iron is coupled to and disposed above the at least one magnet and the back iron is free from contact with the generally L-shaped magnetic yoke; and
        wherein the iron core and the coil winding are free from contact with one of the two substantially perpendicular surfaces when the motor assembly is at rest, during use the motor assembly applies a linear vibration to the at least one magnet along the longitudinal axis of the handle.

2. The appliance of claim 1, wherein the at least one magnet and the iron core are free from contact such that a first gap is formed, the at least one magnet and the generally L-shaped magnetic yoke are free from contact such that a second gap is formed, and the first gap and the second gap are substantially perpendicular to each other.

3. The appliance of claim 1, wherein the at least one magnet and the iron core are free from contact such that a first gap is formed, the at least one magnet and the generally L-shaped magnetic yoke are free from contact such that a second gap is formed, and the first gap and the second gap form an angle therebetween of about 60 degrees to about 120 degrees.

4. The appliance of claim 1, wherein the motor assembly further comprises a leaf spring coupled to the generally L-shaped magnetic yoke, wherein the leaf spring is configured to define a resonant frequency of the motor assembly.

5. The appliance of claim 4, wherein the leaf spring is generally U-shaped.

6. The appliance of claim 5, wherein the leaf spring only contacts a portion of the generally L-shaped magnetic yoke such that the leaf spring is free of contact from one of the two substantially perpendicular surfaces of the generally L-shaped magnetic yoke.

7. The appliance of claim 1, wherein the motor assembly is resonant.

8. The appliance of claim 1, wherein the at least one magnet is configured to define a resonant frequency of the motor assembly.

9. The appliance of claim 1, wherein a resulting force of the motor assembly is substantially linear with a deflection of the at least one magnet.

10. The appliance of claim 1, wherein the motor assembly further comprises a mount coupled to an exterior of one of the two substantially perpendicular surfaces of the generally L-shaped magnetic yoke and to the iron core such that the mount is not disposed within the concave receiving portion.

11. The appliance of claim 1, wherein a frequency of the motor assembly is about 50 Hz to about 500 Hz.

* * * * *